United States Patent [19]
Duffy et al.

[11] Patent Number: 5,402,820
[45] Date of Patent: Apr. 4, 1995

[54] STABILIZER FOR PRESSURE REGULATOR

[75] Inventors: John W. Duffy, Tama; Steven D. Kehoe, Melbourne; Gary L. Scott; William J. Bonzer, both of Marshalltown, all of Iowa

[73] Assignee: Fisher Controls International, Inc., Clayton, Mo.

[21] Appl. No.: 103,071

[22] Filed: Aug. 6, 1993

[51] Int. Cl.$^6$ ............................................. G05D 16/02
[52] U.S. Cl. .................... 137/505.36; 137/505; 137/505.46; 137/513.3
[58] Field of Search ............... 137/505, 502.2, 505.21, 137/505.26, 505.36 I, 505.46, 505.47, 513.3

[56] References Cited

U.S. PATENT DOCUMENTS

| | | | |
|---|---|---|---|
| 3,032,054 | 5/1962 | Irwin | 137/505.46 X |
| 3,786,722 | 1/1974 | Machek | 137/513.3 X |
| 4,782,850 | 11/1988 | Duffy et al. | 137/505.46 X |

OTHER PUBLICATIONS

Fisher Controls Type 627R, Self-Operated Pressure Reducing Regulators, Bulletin 71.1:627, May 1990, pp. 1-4.

Primary Examiner—Stephen M. Hepperle
Attorney, Agent, or Firm—Marshall, O'Toole, Gerstein, Murray & Borun

[57] ABSTRACT

A stabilizer for fluid pressure regulators enhancing regulator stability without affecting the regulator capacity. A stabilizer cartridge with a flexible flapper element has three flapper apertures symmetrically located around the flapper outer perimeter. Each aperture is centered within a window of the stabilizer. Means are provided to mount the stabilizer in proper location and orientation of the apertures within the regulator lower casing throat to sense downstream pressure without affecting regulator capacity.

11 Claims, 2 Drawing Sheets

STABILIZER FOR PRESSURE REGULATOR

This invention relates to fluid pressure regulators and in particular to apparatus for stabilizing the performance of such regulators.

BACKGROUND OF THE INVENTION

Fluid regulators, such as gas pressure regulators are in common use in gas pipeline systems to assist in maintaining system pressure within acceptable limits. As an example, the primary function of a gas pressure regulator is to match the flow of gas through the regulator to the demand for gas placed upon the system. Also, the pressure regulator must maintain the system pressure within acceptable limits. In one type of such gas pressure regulator, a diaphragm assembly is set to a predetermined set point by an adjustable control spring. A pivoting lever is connected to the diaphragm assembly and responds to diaphragm pressure to throttle a disk with respect to an orifice, where the orifice communicates the inlet pressure to the regulator outlet.

The disk and orifice may be referred to as portions of a restricting element which are placed into the gas flow stream and provide a variable restriction that can modulate the flow of gas through the regulator in accordance with the sensed downstream pressure. The diaphragm assembly may also be called a loading element which can provide a loading force to the restricting element. Thus, a loading pressure is applied to the diaphragm in response to the sensed downstream pressure to produce a loading force that will act to close the restricting element. The diaphragm spring provides a reverse loading force which acts to open the restricting element.

Accordingly, if the load flow in the pipeline system decreases, then the regulator flow also must decrease in order to avoid having the regulator place too much gas into the system which would tend to increase the downstream pipeline pressure. On the other hand, if the load flow increases, then the regulator flow also must increase in order to keep the pipeline pressure at the regulator output from decreasing due to a shortage of gas in the pipeline system.

Occasionally, a certain amount of operational instability in the performance of currently used fluid pressure regulators has been noted. In particular, one noted instability involves a fast cycling instability in regulator operation with a repetition frequency of 20–50 hertz. This type of regulator instability has been solved during the design and development of prior pressure reducing regulators by providing a stabilizing flapper in the throat of the regulator lower actuator casing. It is believed that the stabilizing flapper acted in the manner of an air shock to dampen the regulator operational instability.

In this prior regulator, known as the Fisher Type 627R Regulator, a plastic frame was sized to be inserted into the throat and a rubber flapper was mounted therein so as to extend across and block off the throat. A single hole was located in the outer perimeter of the plastic frame and in a position so as not to be covered by the rubber flapper. This single hole in the plastic frame supporting the flapper was to provide sensing of the downstream pressure and so as to communicate this downstream pressure through the throat and into the regulator diaphragm casing. Also, during overpressure conditions, the rubber flapper may be flexed so that the stabilizer opens up fully to unblock the throat and to allow the flow of fluid from the pipeline into the throat and through the diaphragm casing and eventually into the upper casing so as to exit from the regulator venting port during internal relief of the unit.

One difficulty noticed with the single hole stabilizer developed for this prior regulator is that downstream pressure sensing varies in accordance with the location and orientation of the hole. That is, the best downstream pressure sensing is achieved when the single hole location and orientation is as close as possible to the downstream area and the least amount of downstream pressure sensing is noted when the single hole is located and oriented away from the downstream area and is placed towards the upstream area. Thus, the regulator capacity is a function of the location and orientation of the single hole in the stabilizer unit.

It is desired to provide a stabilizer for pressure reducing regulators which decreases regulator instability and which is not affected by the location and orientation of the stabilizer mounting within the regulator throat. Further, it is desired to provide a stabilizer for use as a retrofit cartridge to be mounted into existing fluid pressure regulators so that the stabilizing cartridge can become a permanent component of the regulator and not become loose or otherwise dislodged during the life of the regulator.

SUMMARY OF THE INVENTION

A stabilizer for stabilizing the performance of fluid pressure regulators includes a flexible flapper element mounted across the regulator throat. Three apertures are symmetrically located around the outer perimeter of the flexible flapper element for reliably sensing the pressure in the pipeline at a downstream area irrespective of the orientation of the flapper. The ratio of the combined areas of the three flapper element holes to the regulator diaphragm area is about $0.00015/1.0 \pm 0.00005/1.0$. The present invention enables shock absorber-type stabilization of a fluid pressure regulator without affecting the regulation and capacity performance of the regulator. Thus the regulation and capacity performance of the pressure regulator including the stabilizer of the present invention is equal to a regulator without the stabilizing unit.

In particular, the stabilizing cartridge may be permanently retained within the throat of the regulator lower casing and situated so as to be recessed approximately 0.125 inch from the extreme outward end of the throat of the lower casing. The stabilizing cartridge includes a disk portion shaped such that the disk perimeter is approximately 0.125 inch spaced from the disk center portion so as to provide the required spacing of the flexible flapper from the end of the throat. The disk is formed substantially opened with several spokes and includes means for mounting a flexible flapper element against the spokes so that the three symmetrically located flapper holes are centered in windows formed by the spokes, and with the holes being within 0.0625 inch of the perimeter edge of the flapper. It has been found that this configuration enables the desired downstream pressure sensing to be obtained so that the regulating and capacity performance of a pressure regulator with the stabilizer of the present invention is as good as the pressure regulator without the stabilizer.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

FIGS. 1-6 illustrate a preferred embodiment of a fluid pressure regulator, such as a gas pressure regulator in accordance with the invention. The illustrated gas pressure regulator includes a stabilizer for stabilizing the performance of the pressure regulator as will be described hereinafter wherein a stabilizing cartridge is installed into the throat of the regulator lower casing. It is to be understood that a liquid pressure regulator also may be provided in accordance with the principles of the invention, as the illustrated gas pressure regulator is one example of a fluid pressure regulator according to the invention.

Figure 1:
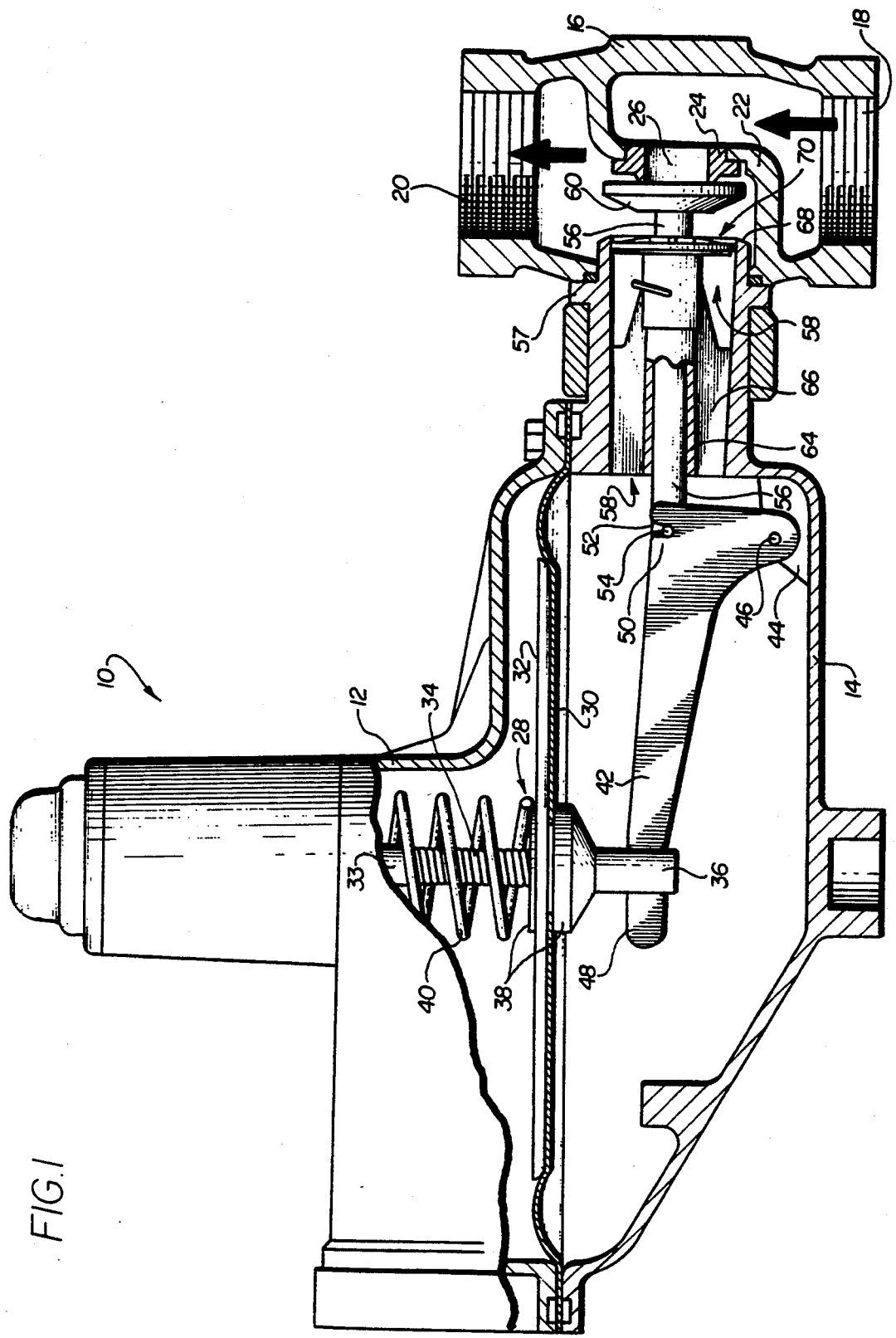
FIG. 1 is a partly fragmented sectional elevational view of a fluid pressure regulator including a stabilizer in accordance with the principles of the present invention.

FIG. 1 illustrates a gas pressure regulator which includes a spring case 12, a diaphragm case or lower regulator case 14, and a body 16. Within body 16, there is provided an inlet 18 for connection to a fluid pressure, such as a gas pressure source, and there is also provided an outlet 20 for connection to a downstream pipeline. Body wall 22 includes an orifice unit 24 containing a passageway 26 which communicates the inlet 18 to the outlet 20.

A loading element in the form of a diaphragm assembly 28 mounted within the regulator includes a diaphragm 30 mounted at its perimeter between the diaphragm case and the spring case, and a diaphragm plate 32 mounted to the central portion of the diaphragm. A spring seat 38 is inserted through a suitable aperture at the center of diaphragm 30 and diaphragm plate 32. A reset rod 33 is inserted through a relief spring 34, then threadably engages a threaded portion of pusher post 36 so as to lock the diaphragm assembly together. A diaphragm spring 40 applies a sufficient loading force downwardly on the diaphragm plate 32 so as to provide a pressure set point for the regulator as will be described more particularly hereinafter.

A lever assembly includes a pivoting lever 42 pivotally connected to a bracket 44 at pivot point 46. A lever end 48 is drivingly engaged with the end of the pusher rod 36. Another lever end 50 includes a notched portion 52 engaging a pin 54 mounted on a sliding stem 56. Diaphragm casing 14 includes a hollow stub 57 projecting from casing 14 with an interior throat 58. Within stub 57 a stem guide 64 is supported by a web 66 between diaphragm casing 14 and stub end 68. The stem guide is a hollow cylindrical member adapted to accommodate the sliding stem 56.

Throat 58 communicates diaphragm casing 14 with the downstream pressure at outlet 20 as shown in FIG. 1. A restricting element such as a disk 60 is mounted to one end of stem 56 for engaging orifice unit 24 in restricting the passage of fluid in passageway 26 between inlet 18 and outlet 20 of body 16 in response to the regulator loading element, i.e., diaphragm assembly 28. As can be seen from FIG. 1, pivoting of the lever 42 in a clockwise direction around pivot point 46 moves the valve stem 56 towards the right in FIG. 1 thus forcing the disk 60 towards the orifice unit 27. On the other hand, counter-clockwise pivotal movement of lever 42 about pivot point 46 pulls valve stem 56 towards the left in FIG. 1 and moves disk 60 away from the orifice unit 24. Regulator 10 includes conventional relief means permitting internal pressure relief between the lower and upper casings.

In the initial setup of regulator 10, an adjusting screw coupled to diaphragm spring 40 is adjusted to adjust the spring compression on diaphragm 30 while the downstream pressure at outlet 20 is monitored with a pressure gauge during the adjustment procedure. Adjusting the spring compression so as to compress diaphragm spring 40 tends to urge the diaphragm assembly downwardly in FIG. 1, thereby pivoting the lever 42 in a counter-clockwise direction about pivot point 46 which lifts the disk 60 off of or away from orifice 26. This opens the orifice or increases the opening and allows the coupling of process fluid between the inlet 18 and the outlet 20 via the orifice passageway 26.

When the pipeline load flow decreases, this causes an increase in the downstream pressure at outlet 20, which pressure is coupled through throat 58 into diaphragm casing 14. Regulator 10 must regulate the flow of fluid through body 16 so as to prevent too much gas being placed into the system. Thus, as the pressure increases in diaphragm casing 14 beyond the regulator set point, this forces the diaphragm 30 upwardly in FIG. 1 which pivots lever arm 42 clockwise about pivot pin 46 so as to move disk 60 toward the orifice and thereby restrict the passage of gas through passageway 26. Thus, once the regulator set point is reached, the regulator must match the flow of gas through the regulator to the demand for gas placed upon the system.

In connection with the regulator of FIG. 1, this means that the fluid flow area through passageway 26 is proportionally increased or reduced in relation to downstream demand, until a position of equilibrium is reached and the regulator maintains a steady-state position about the regulator set point. It is therefore desired that the regulator provide a stable flow of fluid or gas through body 16 so as to match the amount required by the system.

In accordance with the principles of the present invention, there is provided a stabilizing device 70 to stabilize the regulator performance, i.e. provide stability in the regulator output pressure as a function of the system's pressure demands as the regulator operates to maintain the desired set point.

Reference may be made to FIGS. 2-6 wherein there is illustrated a preferred embodiment of the invention. The stabilizing cartridge 70 is inserted within the throat 58 and around the stem guide 64 and is clipped in place on the stem guide. Stabilizing cartridge 70 includes a generally flat disk 72 formed with two concentric rings, i.e. an outer ring 74 and a concentric inner ring 76 joined together by radially extending and arcuately separated spokes 78. A series of windows 80 are respectively defined between oppositely disposed portions of inner ring 76 and outer ring 74 and by respective oppositely disposed spokes 78. The inner and outer rings are slightly spacially disposed with respect to each other along the longitudinal central axis of the stabilizing cartridge 70 as shown for instance in FIGS. 2 and 5. The longitudinal axis separation of inner ring 76 and outer ring 74 is preferably about 0.0625–0.125 inch, and the significance of this separation will be described more particularly hereinafter.

Stabilizer 70 also includes a mounting tubular retainer 82 having a slot 84 extending substantially but not quite the entire length thereof. The unslotted end of mounting tubular retainer 82 has a smaller diameter end portion 86 with a diameter matching the diameter of inner ring 76. A flexible flapper 88 formed such as of rubber has a central aperture substantially the same as the outer diameter of tubular end 86. Disk 72 is mounted to mounting tubular retainer 82 by placing inner ring 76 around the end portion 86 until flapper 88 is butted against a shoulder 90. The units may then be bonded in place.

Figure 4:
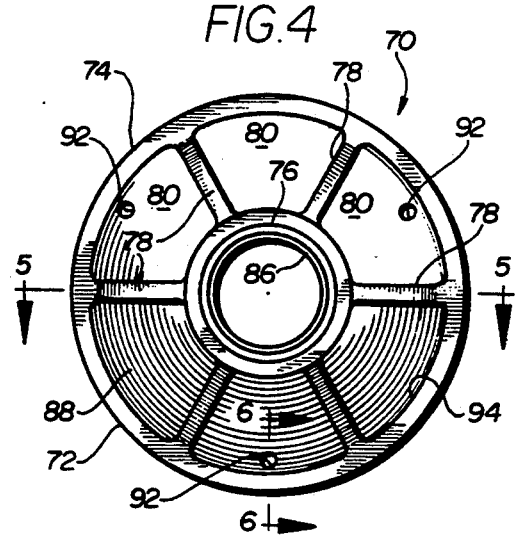
FIG. 4 is a front elevational view of the stabilizing cartridge shown in FIGS. 1-3.
Figure 6:
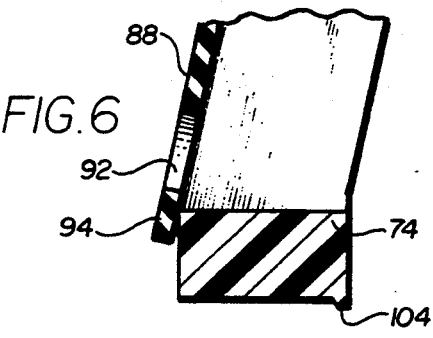
FIG. 6 is a fragmented sectional view taken along section lines 6—6 of FIG. 4 illustrating one of the holes in the perimeter of the flapper element.
Figure 5:
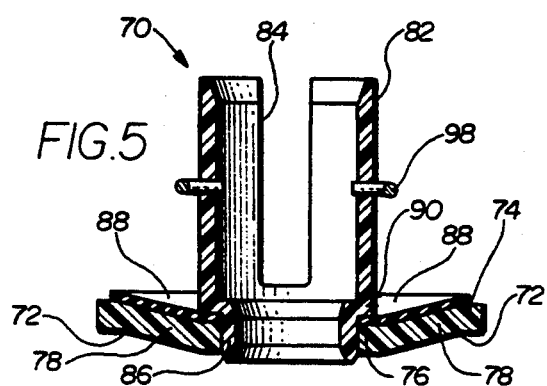
FIG. 5 is a sectional view taken along section lines 5—5 of FIG. 4.

Flexible flapper 88 has three apertures 92 symmetrically located around the flapper outer perimeter 94 for sensing the downstream pressure. As shown in FIG. 4, the holes are located so as to be placed within a respective window 80 and symmetrically disposed around the flapper. Three symmetrically located apertures ensures that at least one aperture will be located near the downstream pressure area of body 16 so that reliable pressure sensing is enabled.

In the preferred embodiment of the invention it was found that holes 92 must be located within about 0.0625 inch of the outer edge of the flapper 88 and that they must be centered within the windows 80 when assembled onto disk 72. It has also been found to be desirable to have the ratio of the combined areas of the three holes 92 to the area of the regulator diaphragm 30 to be about $0.00015/1.0 \pm 0.00005/1.0$. The above factors aid in enabling apertures 92 to reliably sense the downstream pressure so that regulator capacity is not affected by stabilizer 70.

Figure 2:
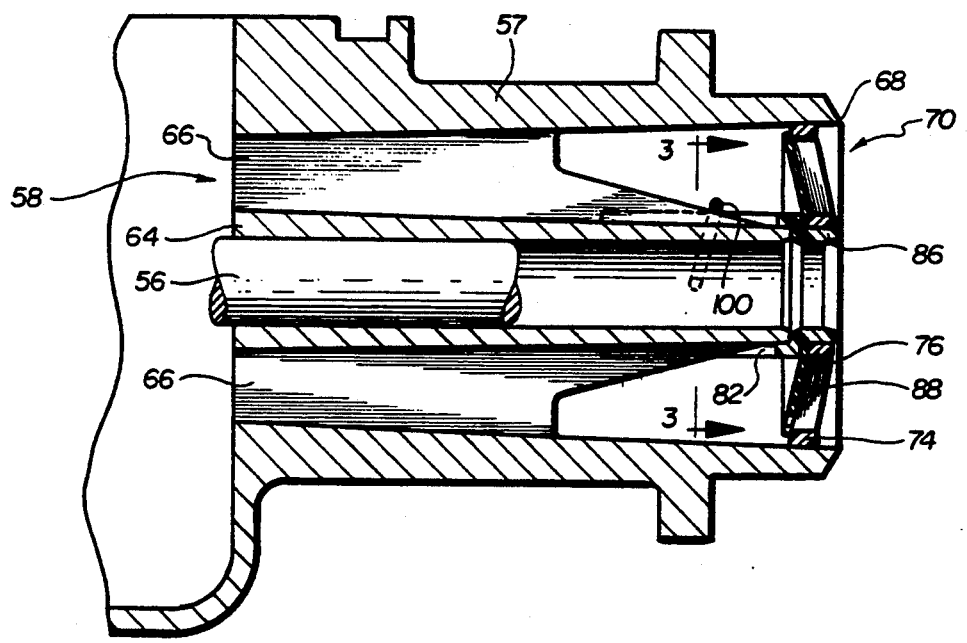
FIG. 2 is an enlarged sectional view of a stabilizer cartridge inserted into a pressure regulator.

In a constructed embodiment of the invention such as illustrated herein, the total combined area of the three flapper holes 92 was 0.0143 sq. in. and the total area of the regulator diaphragm 30 was 113 sq. in. In addition, it was found desirable that while the three flapper holes 92 needed to be as far out towards the perimeter of the flapper 88 as is practical for manufacturing, the holes must be recessed inwardly from throat end 68. Accordingly, as shown in FIG. 2, stabilizing cartridge 70 is mounted into throat 58 so that outer ring 74 is recessed about 0.0625–0.125 inch from throat end 68. It has been found that all of the above factors are desirable in order that the downstream pressure at outlet 20 is sensed sufficiently so as to provide more constant pressure regulation by regulator 10 with stabilizer 70 in place and without affecting the regulator capacity.

Figure 3:
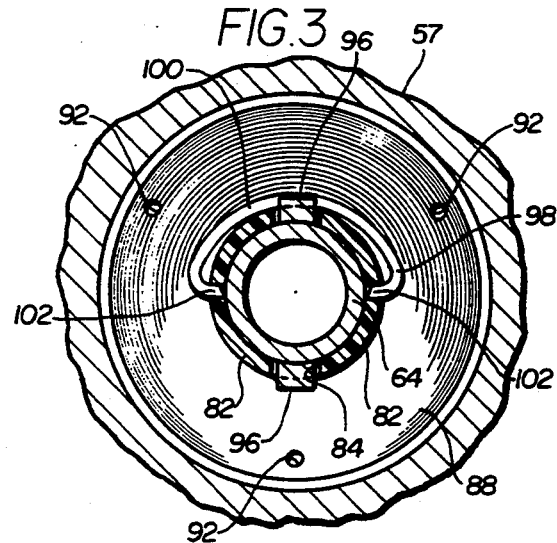
FIG. 3 is a sectional view taken along section lines 3—3 of FIG. 2 illustrating the stabilizing cartridge installed in the throat of the pressure regulator lower casing.

Two other factors are also desired in order to orient and maintain the correct position of stabilizer 70 within the regulator. With reference to FIG. 3, it can be seen that the tapered ends of webs 66 above stem guide 64 form a pair of oppositely disposed ridges 96 projecting outwardly from the outer surface of the stem guide. The size of ridges 96 match the slots 84 in tubular retainer 82 to aid in mounting retainer 82 onto the stem guide and to properly orient and align holes 92 with respect to the location of the downstream pressure area of body 16. Also, a retaining clip 98 is captured within opposite apertures in mounting tubular retainer 82 and includes a central clipping portion 100 with opposite clip ends 102. As shown in FIG. 3, the opposite clip ends 102 are cut in a bevelled manner so as to self-center mounting tubular retainer 82 when the stabilizer cartridge 70 is installed into the throat of the regulator.

As shown in FIG. 2, mounting tubular retainer 82 is slidably installed onto stem guide 64 until shoulder 90 butts up against the end of the stem guide. At this point, clip 100 will be providing a clipping force on the stem guide 64 to aid in securely maintaining the stabilizer cartridge in place. Outer ring 74 also includes a peripheral lip 104 which tends to seal the stabilizing cartridge in the throat and maintain the desired position as shown in FIG. 2.

During overpressure conditions flapper 88 flexes away from the windows 80. This readily enables internal relief of the regulator by permitting the overpressure fluid to flow through the open windows, into the throat 58 and into casing 14 for exiting the regulator through conventional relief means in the diaphragm assembly 28.

The illustrated stabilizing cartridge 70 of the present invention is especially advantageous when utilized as a retrofit for existing pressure regulators. As an example, if an existing pressure regulator contained all of the components shown in FIG. 1, except for the stabilizing cartridge 70, the stabilizing cartridge can readily be added to the regulator unit in the following manner. Initially, the disk 60 is removed from sliding stem 56 by threadably disengaging the parts. Next, a stabilizing cartridge such as 70 shown in FIGS. 3-6 is mounted onto the stem guide 64 until it is securely mounted in position as described previously with the proper location and orientation of the holes 92 being assured in accordance with the present invention. Finally, disk 60 is again threadably engaged onto sliding stem 56. With the above few steps, the prior pressure regulator unit has been upgraded with a stabilizing cartridge in accordance with the present invention to provide more stable pressure regulation without affecting the regulator capacity.

The foregoing detailed description has been given for clearness of understanding only, and no unnecessary limitations should be understood therefrom, as modifications will be obvious to those skilled in the art.

It is claimed:

1. In a gas pressure regulator for a pipeline, the regulator regulating the gas pressure at a regulator outlet coupled to the pipeline, the regulator including (1) a loading element, (2) an actuator casing including a throat with a throat end communicating with the regulator outlet coupled to the pipeline, and (3) a gas flow restricting assembly connected to said pipeline and to said loading element, wherein the loading element applies sufficient loading on the gas flow restricting assembly to regulate the gas pressure at the regulator outlet, the improvement of a stabilizer for insertion into said throat to stabilize pressure regulation, said stabilizer comprising:

a flexible flapper mounted in said throat adjacent the regulator outlet to extend across the throat in a first closed position and flexible to provide a second open position for relieving pressure in said pipeline through said throat and into the actuator casing, said flexible flapper including at least three apertures symmetrically located around the outer perimeter of said flexible flapper for sensing the pressure in said pipeline at a downstream location with respect to said gas flow restricting assembly without affecting the regulator capacity.

2. The improvement of claim 1, wherein said loading element includes a regulator diaphragm and the ratio of the combined areas of said three flapper apertures to the regulator diaphragm area is about 0.00015/1.0.

3. The improvement of claim 2, wherein said flexible flapper is mounted in said throat in a recessed location about 0.125 inch from said throat end.

4. The improvement of claim 1, wherein said stabilizer includes a base of concentric inner and outer rings joined by spokes, and a retainer for retaining said flexible flapper fixed to said inner ring while enabling said flexible flapper to be flexed away from said open windows.

5. The improvement of claim 4, wherein said loading element includes a regulator diaphragm and the ratio of the combined areas of said three flapper apertures to the regulator diaphragm area is about 0.00015/1.0.

6. The improvement of claim 5, wherein said flexible flapper is mounted in said throat in a recessed location about 0.125 inch from said throat end.

7. In a gas pressure regulator for a pipeline, the regulator regulating the gas pressure at a regulator outlet coupled to the pipeline, the regulator including (1) a loading element, (2) an actuator casing including a throat with a throat end communicating with the regulator outlet coupled to the pipeline, and (3) a gas flow restricting assembly connected to said pipeline and to said loading element, said gas flow restricting assembly including a slidable valve stem supported by a stem guide in said throat, wherein the loading element applies sufficient loading on the gas flow restricting assembly to regulate the gas pressure at the regulator outlet, the improvement of a stabilizer for insertion into said throat to stabilize pressure regulation, said stabilizer comprising:

a stabilizer cartridge including, a base formed of concentric inner and outer rings joined by spokes, wherein said rings and spokes define open windows therebetween;

a flexible flapper having at least one aperture located at the outer perimeter of said flexible flapper;

a retainer for retaining said flexible flapper fixed to said inner ring while enabling said flexible flapper to be flexed away from said open windows;

said retainer in the form of a cylindrical tube and including means for mounting said stabilizing cartridge onto said stem guide with said retainer slidably engaging said stem guide while permitting said valve stem to operatively slide through said stabilizer cartridge;

and said flexible flapper including means for substantially aligning at least one of said apertures at the outer perimeter of said flexible flapper immediately adjacent the regulator output to enable reliable sensing of the downstream pipeline pressure, and wherein the flapper is enabled to move away from the windows when the downstream pressure sensed through said aperture on one side of the flexible flapper is greater than the pressure in said throat at the opposite side of said flexible flapper so that fluid can pass through said windows and around the flexible flapper into the throat.

8. The improvement of claim 7, wherein said flexible flapper is mounted in said throat in a recessed location about 0.125 inch from said throat end.

9. The improvement of claim 8, including a peripheral lip on said outer ring for sealing said outer ring in said throat.

10. The improvement of claim 9, wherein said flexible flapper includes at least three apertures symmetrically located around the outer perimeter of said flexible flapper.

11. The improvement of claim 10, wherein said loading element includes a regulator diaphragm and the ratio of the combined areas of said three flapper apertures to the regulator diaphragm area is about 0.00015/1.0.

* * * * *